United States Patent Office 3,726,865
Patented Apr. 10, 1973

3,726,865
DERIVATIVES OF 7-AMINOCEPHALOSPORANIC ACID
Hans Bickel, Binningen, Johannes Mueller and Rolf Bosshardt, Arlesheim, Heinrich Peter, Riehen, and Bruno Fechtig, Reinach, Basel-Land, Switzerland, assignors to Ciba-Geigy Corporation, Ardsley, N.Y.
No Drawing. Filed June 2, 1970, Ser. No. 42,887
Claims priority, application Switzerland, June 6, 1969, 8,656/69
Int. Cl. C07d 99/24
U.S. Cl. 260—243 C          6 Claims

ABSTRACT OF THE DISCLOSURE

Derivatives of 7-azidoacetylaminocephalosporanic acid which contain instead of the acetoxymethyl group in 3-position another group.

---

The present invention is concerned with the manufacture of new therapeutically active derivatives of 7-aminocephalosporanic acid (ACA) of the formula (I)
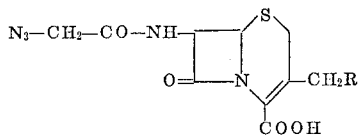

in which R represents hydrogen or a hydroxyl group esterified by a carboxylic acid in which ester oxygen atoms may be replaced by sulphur atoms, except the acetoxy group, an unsubstituted or N-substituted carbamoyloxy group in which oxygen atoms may be replaced by sulphur atoms, or a quaternary amino group, and of their possibly inner salts. The compounds of the Formula I are obtained by known methods when (a) A compound of the Formula II (II)
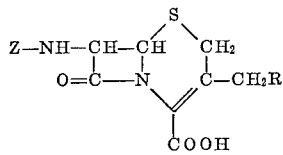

in which Z represents a reactive, esterified hydroxyacetyl residue and R represents hydrogen or a free or esterified hydroxyl group (in which ester-oxygen atoms may be replaced by sulphur atoms) is reacted with a metal azide, especially an alkali metal azide such as sodium or potassium azide; or (b) A compound of the Formula II, in which Z represents hydrogen and R hydrogen or a free or esterified hydroxyl group (in which ester-oxygen atoms may be replaced by sulphur atoms) is acylated by the group $N_3$—$CH_2$—CO— or (c) From compounds of the Formula I in which the carboxyl group is protected by an eliminable protective group, such group is split off, and a resulting compound in which R represents the acetoxy group is converted into a compound in which R is a free hydroxyl group or a quaternary amino group, and a compound in which R is a free hydroxyl group into a compound containing an ester group other than the acetoxy group (in which oxygen atoms may be replaced by sulphur atoms) or into a possibly N-substituted carbamyloxy group in which oxygen may be replaced by sulphur atoms, and, if desired, in a compound in which R is a hydroxyl group esterified by a carboxylic acid other than acetic acid, this group is replaced by a quaternary amino group and, if desired, the resulting compounds are converted into their therapeutically acceptable metal salts such as alkali or alkaline earth metal salts or salts with ammonia or with organic bases, or from a resulting salt the free carboxylic acid or possibly inner salts are formed.

In the reaction according to process (a), a reactive esterified hydroxyacetyl residue is primarily a hydroxyacetyl residue esterified with a strong inorganic acid, such as a mineral acid, or with a strong organic sulfonic acid, such as a lower alkyl or an aryl sulfonic acid, for example, toluene sulfonic acid. In particular, Z is a hydroxyacetal group esterified by hydrogen halide, such as hydrogen fluoride, chloride, iodide or especially bromine.

The reaction of the compound II, in which Z represents a reactive, esterified hydroxyacetyl group, with a metal azide is carried out at room temperature or with moderate heating or cooling, preferably at 20 to 40° C. As solvent there may be used water or an aqueous-organic solution, for example a mixture of water with a water-miscible alcohol such as methanol or ethanol.

The acylation of the compound II, according to process (b), in which Z represents hydrogen, is carried out in the manner known for the acylation of aminoacids, for example by means of an acid halide, especially acid chloride, or an acid azide or anhydride, especially a mixed anhydride, for example a mixed anhydride formed with a mono-esterified carbonic acid, pivalic acid or trichloroacetic acid, or with the free acid itself in the presence of a condensing agent such as a carbodiimide, for instance dicyclohexylcarbodiimide.

Protective groups suitable for process (c) are especially those that can be split off under acid, neutral or slightly basic conditions, primarily ester groups eliminable by acid hydrolysis or alcoholysis, for example para-methoxy benzyloxy or para-nitrobenzyloxy groups, optionally substituted benzylhydryloxy, or tertiary butyl, tertiary amyl, silyl and stannyl ester groups, see, for example, British specification 1,073,530 and Dutch patent application 6717107.

The conversion of the compound of the Formula I, in which R represents the acetoxy group, into a compound containing a free hydroxyl group and its esterification with an acid other than acetic acid, or its conversion into carbamyl derivatives or into compounds in which R represents a quaternary amino group is carried out in known manner.

As esterified hydroxyl groups R, in which oxygen atoms may be replaced by sulphur, there may be mentioned monocyclic and dicyclic arylcarbonyloxy- or -thiocarbonyloxy-, arylcarbonylmercapto or -thiocarbonylmercapto groups which may be substituted, for example, by halogen atoms especially chlorine, substituted loweralkanoyloxy groups such as formyloxy, propionyloxy, butyryloxy, pivalyloxy, chloracetoxy, and, if desired, for instance by lower alkyl, lower alkoxy or lower alkylmercapto residues, halogen atoms or the nitro group, especially the benzoylmercapto group. Further examples for R are:

(a) A carbamyloxy group of the formula

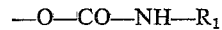

in which $R_1$ represents an aliphatic, aromatic, araliphatic or heterocyclic residue, which may be substituted, preferably by one or several lower alkoxy groups or halogen atoms, or a substituted linear or branched lower alkyl radical, preferably substituted by one or several lower alkoxy groups or halogen atoms, such as the methyl, ethyl or especially β-chlorethyl residue; or (b) A thiocarbamylmercapto group of the formula

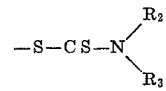

in which $R_2$ has the above meaning and $R_3$ represents hydrogen or $R_2$; or (c) A quaternary amino group in which the quaternary nitrogen atom is, for example, a member of an aromatic ring, such as a quinoline, isoquinoline or pyrimidine ring, especially, however, of an unsubstituted or substituted pyridine ring, for example of the formula

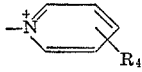

in which $R_4$ represents hydrogen or one or several lower alkyl, lower alkoxy-carbonyl, caramyl or carboxyl groups or one or several halogen atoms.

The salts of the compounds are metal salts, especially salts of therapeutically acceptable alkali or alkaline earth metal salts such as the salts with sodium, potassium, ammonium, calcium, or with organic bases, for example triethylamine, N - ethylpiperidine, dibenzylethylenediamine, procain. When the group R is basic, inner salts may be formed.

The new compounds possess a good antibacterial activity. They act both against Gram-positive and especially Gram-negative bacteria, for example against *Staphylococcus aureus* (penicillin resistant), *Escherichia coli*, *Klebsiella pneumoniae* and *Salmonella typhosa*, as can be demonstrated in animal tests, for example on the mouse on which they display a chemotherapeutic effect on subcutaneous administration of 1 to 100 mg. per kg., depending on the kind of the bacterial infection. The compounds may therefore be used for combating infections caused by such microorganisms, also as additives to animal feeding stuffs, for preserving foodstuffs or as disinfectants.

The cephalosporin derivatives used as starting materials are known or can be prepared by known methods. Compounds of the Formula II, in which Z represents hydrogen and R an ester group other than the acetoxy group, are advantageously manufactured by the process disclosed in Swiss patent application No. 8,379/68.

The invention includes also any variant of the present process in which an intermediate obtained at any stage of the process is used as starting material and any remaining step(s) is/are carried out or the process is terminated at any stage thereof, or in which the starting materials are formed under the reaction conditions or in which the reactants may be used in form of their salts.

The new compounds may be used as medicaments, for example in form of pharmaceutical preparations containing them in conjunction or admixture with an organic or inorganic, solid or liquid pharmaceutical excipient suitable for enteral, local or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycol, polyalkyleneglycols, white petroleum jelly, cholesterol or other known medicinal excipients. The pharmaceutical preparations may be, for example, tablets, dragees, ointments, creams or capsules, or in liquid form, solutions, suspensions or emulsions. They may sterilized and/or contain assistants such as preserving, stabilizing, wetting or emulsifying agents, solubilizers, salts for regulating the osmotic pressure or buffers; they may also contain further therapeutically valuable substances. The preparations are formulated by the usual methods.

The following examples illustrate the invention.

For 7-aminocephalosporanic acid the abbreviation 7-ACA is used below.

In thin-layer chromatography on silica gel plates the following systems are used:

System 52=n-butanol+glacial acetic acid+water (75:7.5:21)

System 101 A=n-butanoyl+pyridine+glacial acetic acid+water (42:24:4:30)

EXAMPLE 1

3.93 grams of bromoacetyl-7-ACA are dissolved at 30° C. in a mixture of 680 ml. of absolute ethanol and 20 ml. of water. While keeping the solution at this temperature, a solution of 13 g. of sodium azide in 50 ml. of water, heated at 30° C., is stirred in. The batch is then cooled slowly to room temperature and allowed to react in the dark for 15 hours.

The solvent is then distilled off against a condenser of $-60°$ C. under a water-jet vacuum. The still moist residue is taken up in 50 ml. of water and 200 ml. of ethyl acetate, the whole is agitated and the phases are separated. The aqueous phase is covered with 200 ml. of ethyl acetate and immediately adjusted to a pH value of 1.5 by means of concentrated hydrochloric acid. This operation must be performed in an efficient fume cupboard because an abundance of hydrazoic acid is given off. The phases are separated and the aqueous phase is further extracted with $3\times$ 100 ml. of ethyl acetate. The organic phases are washed twice with saturated sodium chloride solution and dried with sodium sulphate, then filtered through a column of 10 g. of silica gel and the filtrates are evaporated to dryness under vacuum. The residue is dissolved in 12 ml. of ethanol and crystallized overnight at $-20°$ C. The 7-azidoacetyl-ACA melts at 132–133° C. The mother liquor is dissolved in a small quantity of methanol and converted with 3 molar methanolic sodium α-ethyl-hexanoate into the sodium salt which likewise crystallizes out after a short time.

$[\alpha]_D^{20}=+129\pm1°$ (c.=1 in water, as the sodium salt); $Rf_{52}=0.27$, $Rf_{101A}=0.45$.

The sodium salt reveals in the ultraviolet spectrum (in water) a maximum at $\lambda=260$ nm. ($\epsilon=9000$).

A mixture of 5.44 g. of the sodium salt of azidoacetyl-7-ACA and 3.02 g. of potassium thiocyanate is dissolved in 15 ml. of water. Then 3.0 ml. of pyridine are added and the solution is adjusted to a pH value of 6.4 by adding 0.26 ml. of 85% phosphoric acid. The mixture is heated for 6 hours at 60° C., then extracted with $6\times$ 75 ml. of a solution of Amberlite LA–1-acetate in methylisobutylketone, once with 75 ml. of methyl-isobutylketone and with $2\times$ 75 ml. of ethyl acetate. [The solution of the liquid ion exchange resin is prepared by stirring a mixture of 200 ml. of Amberlite LA–1, 24 ml. of glacial acetic acid and 600 ml. of methyl-isobutylketone for half an hour with 160 ml. of water and using the organic phase which separates after standing.] The aqueous solution is mixed with 1 litre of alcohol. The whole is kept for 2 hours in an ice bath and the floccular precipitate is filtered off. The filtrate is evaporated under vacuum. The still moist residue is dissolved in 60 ml. of water and filtered through a column containing, from the bottom upwards: 10 ml. of Sephadex CM C–25 (H+ form), 40 ml. of Alox, 10 ml. of Zeo-Carb 226 (H+ form), 40 ml. of Alox, 10 ml. of Dowex 1 (acetate form) and 10 ml. of Sephadex CM C–25 (H+ form). The column is rinsed with a total of 200 ml. of water and the combined eluates are evaporated to dryness under vacuum. The residue is digested with 10 ml. of absolute alcohol and furnishes pure 3-(desacetoxymethyl)-3-pyridiniomethyl-7-(azidoacetylamino)-cephalosporanic acid (dihydrate).

$[\alpha]_D^{20}=+36°\pm1°$ (c.=0.77, in water). $Rf_{52}=0.02$, $Rf_{101A}=0.2$.

The ultraviolet spectrum (in water) reveals a maximum at $\lambda=258$ nm. ($\epsilon=13,150$).

EXAMPLE 2

A solution of 4.53 g. of the sodium salt of 7-azidoacetyl-amino-cephalosporanic acid in 300 ml. of water is heated to 37° C. and its pH adjusted to 7.4 with 2.4 ml. of 0.1 N-sodium hydroxide solution. A suspension of 120 mg. of acetylesterase (from *Bacillus subtilis* ATCC 6633, cf. Belgian Patent 1,080,904) in about 4 ml. of water is added, and the acetic acid formed is currently neutralized with 0.1 N-sodium hydroxide solution (adjustment to pH 7.3; temperature, 37° C.). After 4¾ hours the reaction is complete. The pH is adjusted to 6.5, the solution filtered through a glass frit G4, and lyophilized. There are obtained 5.34 g. of a yellowish resin of the sodium salt of 7-azidoacetylamino-O-desacetyl-cephalosporanic acid.

4.47 g. of this crude product are dissolved directly in a mixture of 50 ml. of absolute dimethylformamide and 14.0 ml. of triethylamine, the solution treated with 8.4 ml. of β-chlorethylisocyanate, and stirred at room temperature for half an hour. The solvent is then expelled in a high vacuum and the resinous residue triturated with 3× 250 ml. of absolute ether. The ether-insoluble residue is dissolved in 125 ml. of 10% phosphate buffer of pH 6.7, and agitated with 750 ml. of ethyl acetate. When the phases have separated, the upper phase is discarded and the lower covered with 750 ml. of ethyl acetate. By the addition of 45 ml. of 2 N-hydrochloric acid the pH of the aqueous phase is adjusted to 2.8. After vigorous agitation, the two phases separate, and the aqueous phase is then saturated with sodium chloride and extracted with 2× 500 ml. of ethyl acetate. The organic phases are washed with 2× 75 ml. of saturated sodium chloride solution, dried over sodium sulfate, and evaporated to dryness under reduced pressure. The resulting resin is dissolved in a mixture of acetone and chloroform (5:95) and chromatographed over a column (diameter, 3 cm.; height, 25 cm.) of 85 g. of silica gel with increasing proportions of acetone in admixture with chloroform. The product is eluted with 20 to 35% by volume of acetone. The slightly yellow-colored eluates are combined and evaporated to dryness under reduced pressure. The residue is dissolved in 6 ml. of methanol, and to the solution are added 1.35 ml. of a 3-molar methanolic solution of sodium-α-ethylhexanoate, then diluted with 10 ml. of acetone, and concentrated slowly under reduced pressure until a turbidity appears. The batch is then seeded (or triturated with a spatula), and colorless crystals appear when the batch is allowed to stand at −10° C. for several hours. The batch is filtered with suction, washed with acetone, dried in a high vacuum, and the pure sodium salt of O-desacetyl-O-(β-chlorethyl-carbamoyl)-7-azidoacetyl-amino-cephalosporanic acid obtained. U.V. spectrum $\lambda_{max}=261$ m$\mu$ ($\epsilon=9350$). Optical rotation, $[\alpha]_D^{20}= +114°\pm1°$ (C.=0.75 in water). Thin-layer chromatogram on silica gel: $Rf_{101A}=0.62$; Rf in the system ethyl acetate-pyridine-acetic acid-water (62:21:6:11)=0.39.

EXAMPLE 3

A solution of 9.06 g. of the sodium salt of 7-azido-acetylaminocephalosporanic acid in 250 ml. of water is converted at 37° C. by means of 240 mg. of acetyl esterase in the manner described in Example 2 into the sodium salt of 7-azidoacetylamino-O-desacetyl-cephalosporanic acid (10.47 g.).

8.79 g. of the resulting crude product are suspended in 100 ml. of absolute dimethylformamide and treated with 0.15 ml. of tri-n-butyl-tin oxide [(Bu₃Sn)₂O]. After that, a solution of 5.2 ml. of methylisocyanated in 45 ml. of dimethylformamide is added dropwise in the course of 15 minutes, and stirring is continued for 1 hour. The reaction mixture is filtered and the filtrate evaporated to dryness in vacuo. The resin-like residue is triturated with 3× 500 ml. of absolute ether (the ether-soluble portion being separated and discarded) and dissolved in 250 ml. of 10% phosphate buffer of pH 6.7. The batch is extracted first with 1.5 liters and then with 0.5 liter of ethyl acetate. The organic phases are extracted back twice, each time with 100 ml. of buffer of pH 6.7, then discarded. The aqueous phases are combined, covered with 1.5 liters of ethyl acetate, the pH adjusted to 2.4 by the addition of 2 N-hydrochloric acid and shaking, and the phases then separated. After being saturated with sodium chloride, the aqueous phase is extracted twice with 1 liter of ethyl acetate each time, the organic phases are successively washed twice with 200 ml. of saturated sodium chloride solution each time, dried over sodium sulfate, and filtered through a column (having a diameter of 4.5 cm.) of 100 g. of silica gel. The column is washed with 500 ml. of fresh ethyl acetate, and the ethyl acetate eluates are combined and evaporated to dryness under reduced pressure. An amorphous residue weighing 4.5 g. is obtained which crystallizes on addition of 15 ml. of methanol. The crude crystallizate is separated, dissolved in moist ethyl acetate, the solution filtered through a column of 10 g. of silica gel, and the dry residue of the eluate converted into the crystalline sodium salt by means of sodium-α-ethyl hexanoate in methanolic solution. The sodium salt can be recrystallized from methanol and, if necessary discolored with a small quantity of animal carbon (Norit). There is obtained in this manner the pure sodium salt of O-desacetyl-O-methylcarbamoyl-7-azidoacetyl-amino-cephalosporanic acid which in its crystal lattice strongly retains half a mol of methanol. U.V. spectrum $\lambda_{max}=260$ m$\mu$ ($\epsilon=8750$). Optical rotation $[\alpha]_D^{20}= +117\pm1°$ (c.=0.88 in water). Thin layer chromatogram on silica gel: $Rf_{52}=0.3$, $Rf_{101A}=0.5$.

We claim:
1. A derivative of 7-aminocephalosporanic acid of the formula

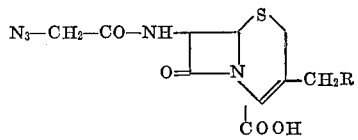

in which R represents a carbamoyloxy group of the formula O—CO—NH—R₁, in which oxygen atoms may be replaced by sulphur atoms, and R₁ is hydrogen, lower alkyl or lower alkyl substituted by one or several lower alkoxy groups or halogen atoms, or a therapeutically acceptable salt thereof.

2. A compound as claimed in claim 1, in which R represents a lower alkyl-carbamoyloxy group or a therapeutically acceptable salt thereof.

3. A compound as claimed in claim 1, wherein R represents an N-halogen-lower alkyl-carbamoyloxy group or a therapeutically acceptable salt thereof.

4. A compound as claimed in claim 1, wherein R represents the β-chlorethylcarbamoyloxy group or a therapeutically acceptable salt thereof.

5. O-desacetyl-O-(β-chlorethyl-carbamoyl) - 7 - azido-acetylamino-cephalosporanic acid or a therapeutically acceptable salt thereof.

6. O-desacetyl-O-methylcarbamoyl-7-azidoacetylamino-cephalosporanic acid or a therapeutically acceptable salt thereof.

References Cited

UNITED STATES PATENTS

| | | | |
|---|---|---|---|
| 3,338,897 | 8/1967 | Takano et al. | 260—243 C |
| 3,340,257 | 9/1967 | Takano et al. | 260—243 C |

FOREIGN PATENTS

| | | | |
|---|---|---|---|
| 6717107 | 6/1968 | Netherlands | 260—243 C |

NICHOLAS S. RIZZO, Primary Examiner

U.S. Cl. X.R.

424—246